United States Patent

Pensa

[15] 3,694,108
[45] Sept. 26, 1972

[54] HYDRAULIC APPARATUS FOR REGULATING THE FLOW OF ONE OR MORE PUMPS

[72] Inventor: Carlo Pensa, Via S. Carlo, Esino Lario (Como), Italy

[22] Filed: April 14, 1970

[21] Appl. No.: 28,425

[30] Foreign Application Priority Data

April 23, 1969 Italy.....................15873 A/69

[52] U.S. Cl. .....................417/222, 91/506, 417/426
[51] Int. Cl........F04b 1/26, F04b 23/04, F04b 41/00
[58] Field of Search......417/222, 426, 427, 428, 286, 417/287, 288; 91/506

[56] References Cited

UNITED STATES PATENTS

| | | | |
|---|---|---|---|
| 3,554,671 | 1/1971 | Schlinke | 92/12.2 X |
| 2,588,522 | 3/1952 | Harris | 417/222 X |
| 2,971,498 | 2/1961 | Bloch | 417/222 X |
| 3,252,419 | 5/1966 | Tyler | 417/222 X |

FOREIGN PATENTS OR APPLICATIONS

| | | | |
|---|---|---|---|
| 625,055 | 6/1949 | Great Britain | 417/222 |
| 681,601 | 10/1952 | Great Britain | 417/222 |

Primary Examiner—William L. Freeh
Assistant Examiner—Richard E. Gleck
Attorney—Michael S. Striker

[57] ABSTRACT

In combination with a pump having a variable rate of flow, a device for varying such rate of flow is governed by the pressure generated by the pumps through a variable transmission mechanism the ratio of which depends on the said rate of flow, whereby the power output of the pump can be maintained at a predeterminate value. The device can be used with two pumps for limiting the total power output of both pumps, as being governed by the average of the two pressures.

12 Claims, 3 Drawing Figures

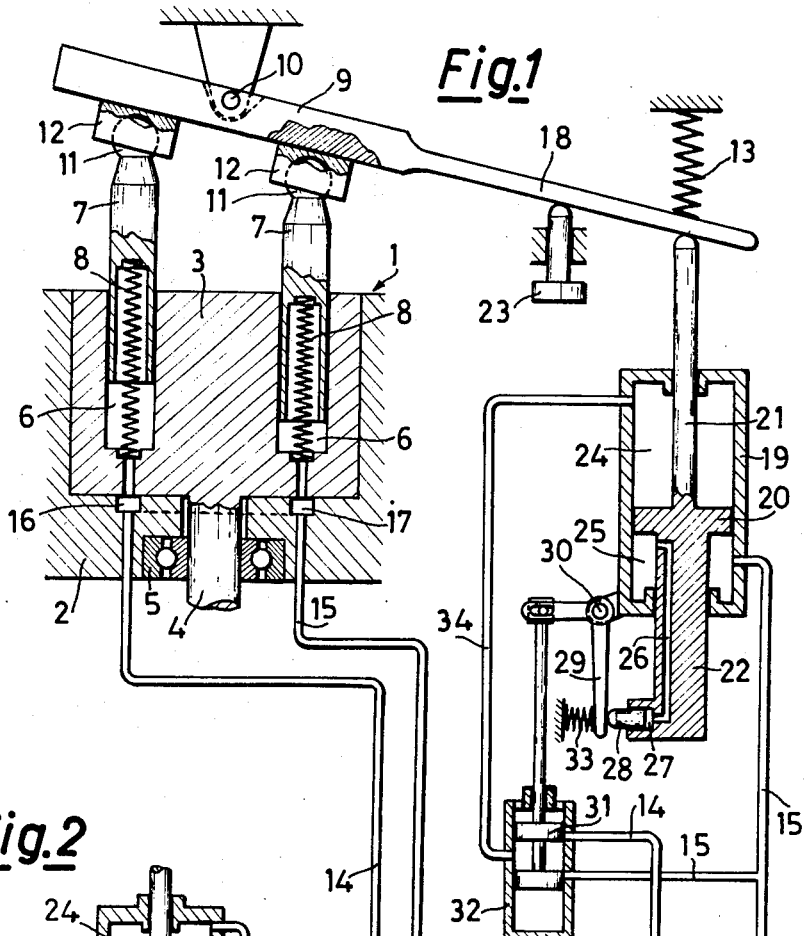
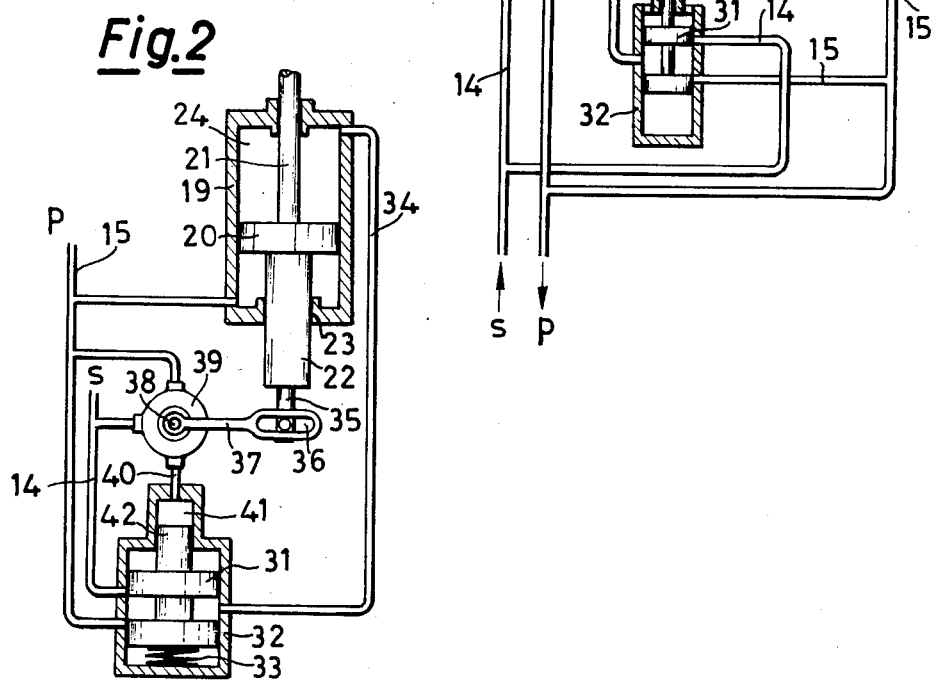

HYDRAULIC APPARATUS FOR REGULATING THE FLOW OF ONE OR MORE PUMPS

The present invention relates to an apparatus for regulating the flow of one or more variable flow pumps in such a manner as to keep the absorbed mechanical power of the pump or pumps and consequently the delivered hydraulic power substantially constant or nearly constant, when this power reaches a predetermined limit which it is not desired to exceed.

According to the invention, the member for varying the flow of the pump is moved by motor means operated by the pressure generated by the pump by way of a drive having a variable ratio determined by the position of said member.

Said device can be for example a kinematic mechanism whose transmission ratio is determined by the position of said member, and in particular it can be proportional to the flow generated by the pump.

A particularly interesting embodiment of the apparatus according to the invention can be obtained by applying it to the regulation of two pumps driven by a single source of mechanical energy and operating any two independent mechanisms.

The accompanying drawings show in an entirely diagrammatical manner some embodiments of these and other characteristics of the invention, in which:

FIG. 1 is a diagrammatical arrangement of an apparatus with only one pump;

FIG. 2 shows a variation;

Figure 3:
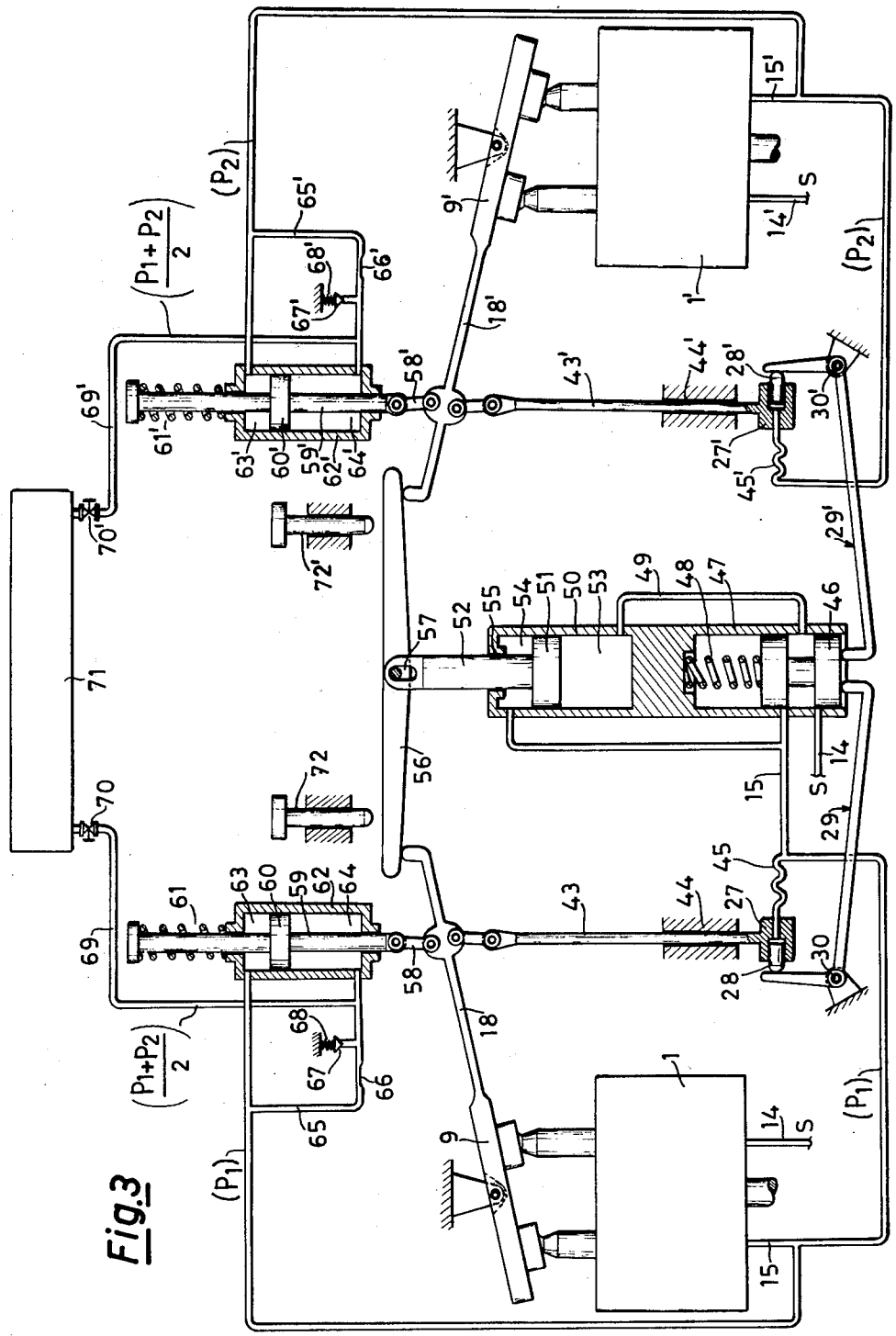
FIG. 3 is the diagrammatical arrangement of an apparatus with two pumps.

FIG. 1 generally indicates a pump 1 of variable flow of conventional type in whose casing 2 a rotor 3 is made to rotate by a motor, not shown, by way of the shaft 4 supported by the casing by way of the bearing 5; in the cylindrical cavities 6 of the rotor 3 pistons 7 slide, of which only two are illustrated, and which are thrust by springs 8 against a plate 9 mounted to oscillate about a pivot 10, fixed with respect to the casing 2; the heads 11 of the pistons 7 are spherical and are housed in sliding blocks 12 which slide freely on the plate 9.

The suction inlet and pressure outlet ducts of the pump are indicated respectively by 14 and 15 and communicate respectively with two channels 16 and 17 which each extend into the casing for an arc of a circle slightly less than 180°. The duct 14 is connected to discharge indicated by $s$ and the duct 15 is connected to a utilization main in which the pump generates a pressure $p$.

The volume of liquid displaced at each stroke of each piston 7 varies according to the inclination of the plate 9.

This pump, of conventional type, is illustrated only for completeness of description and it can be of any variable flow type provided with a member which, on being moved, causes a variation in the flow of the pump. In the example illustrated the said movable member comprises the tiltable adjusting plate means 9 whose angular position with respect to the pivot 10 is controlled by way of the adjusting lever arm 18 rigid with it.

The hydraulic motor which causes the inclination of the plate 9 to be varied, and in consequence the flow of the pump, as a function of the product of the flow generated by the pump and the pressure at which the liquid is pumped into the duct 15 comprises a cylinder 19 in which a working piston 20 slides. The working piston 20 is on top connected to a relatively thin piston portion 21 which projects in a tight manner from the cylinder 19, and on the upper extremity of which rests the extremity of the arm 18 biassed by a spring 13. A member indicated diagrammatically by 23 moves the arm 18 against the action of the spring 13, by maneuvering it manually or by any other means. The lower end of piston 20 is connected to a piston portion 22, of greater diameter than the piston portion 21, and which projects in a fluid tight manner from the cylinder 19.

The piston 20 divides the cavity of the cylinder 19 into two chambers 24 and 25, the transversal free section of the one being double the other respectively.

In the piston portion 22 there is a duct 26 which puts the first chamber 25 into communication with a control cylinder 27 situated at the extremity of said piston portion 22, and in which slides a control piston member 28 which rests against one arm of a right angled transmission lever 29 pivoted at the fixed point 30 and maintained against the control piston 28 by an adjustable force provided by a biassing means indicated diagrammatically by the spring 33. The other arm of the lever 29 acts on a valve slide or distributor member 31 which slides in a valve cylinder 32. One branch of the duct 14, one branch of the duct 15 and a duct 34 from the chamber 24 are all connected to the cylinder 32. The valve slide 31, when moved, connects the duct 34 to the duct 14 or to the duct 15 respectively, and closes both ports of the ducts 14 and 15 in one of its intermediate positions.

It is evident that it is not necessary for the cylinders 19 and 32 to be fed by the pressure $p$ by way of the duct 15. Another suitable pressure could be used from any other source, provided that the pressure $p$ is fed into the duct 26 by another means.

The device described above operates in the following manner.

When the pressure in the duct 15 increases, following a greater resistance met by the liquid in the consumer machine, not shown, which is fed by the liquid under pressure, said pressure is exerted on the control piston 28, overcomes the force exerted by the spring 33, moves the right angled lever 29 which in its turn raises the valve slide 31 which opens communication between the second chamber 24 and the duct 14 which is connected to the suction of the pump. The pressure in the chamber 24 thus descends to atmospheric pressure or to the pressure $s$ in the tank from which the discharged liquid is resucked, and the pressure existing in the chamber 25, which is that generated by the pump, moves the piston 20 upwards and with it the adjusting arm 18 which diminishes the inclination of the plate 9 for reducing the flow of the pump. At the same time by also raising the piston 20 with piston portion 22, the control piston 28 is moved upwards and acts on the lever 29 by a lever arm of lesser length forming a variable transmission between control piston 28 and distributor valve slide 31. When the ratio of transmission 29 is reduced by shortening the effective lever arm, the spring 33 then overcomes the action of the piston 28, moving the lever 29 and lowering the spool 31 until it closes the outlet of the duct 14 in the cylinder 32 so halting the movement of the piston 20 and the adjusting means 18, 9 in a new position.

In this manner an increase in the delivery pressure of the pump causes a diminution in its flow, and by suitably dimensioning the arms of the lever 29 the product of the pressure and flow, or rather the power required for operation of the pump, can be made to remain substantially constant or not to exceed the value determined by the force exerted by the spring 33.

A decrease in the delivery pressure would cause an increase in flow of the pump since spring 33 would be able to overcome the force generated by pressure $p$ on piston 28, then spring 33 would move the lever 29 to the right (as illustrated in FIG. 1), which in turn would lower the valve slide 31 which would open communication between chamber 24 and duct 15 as discussed above. Duct 15 is connected to the pressure side of the pump. The pressure in chamber 24 would then be equal to the pressure in chamber 25, but since the transversal free section of chamber 24 is double that of chamber 25 piston 20 would be moved downwardly and with it arm 18, which increases the inclination of plate 9 so increasing the flow of the pump.

An analogous result could be obtained for example by making the fulcrum 30 of the lever 29 movable instead of the piston 28.

By means of the member 23 it is possible to diminish the flow of the pump 1 independently of the movement of the piston 20, either voluntarily or depending upon other factors which intervene to control the member 23. This member in practice can be part of a hydraulic servomotor in order not to have to control it with considerable force.

It is also possible to use other means for varying the action of the pressure $p$ on the means which vary the flow of the pump.

FIG. 2 represents diagrammatically one of such possible variations. It shows the cylinder 19 from which the piston portion 22 projects. This comprises a control portion 35 which is engaged in a slot 36 in the lever 37 which by rotating about the pivot 38 regulates a pressure reducing valve 39 of any known type, to which the branches of said ducts 14 and 15 are connected and which introduces into the duct 40 a pressure which is a fraction of the pressure $p$ existing in the duct 15 determined by the position of the lever 37. This pressure is introduced into the cylinder 41 in which a piston 42 slides rigid with a valve slide 31 which slides in the valve cylinder 32 against the reaction of the spring 33 as shown in FIG. 1. The ducts 14, 15 and 34 are connected to the cylinders 19 and 32 as shown in FIG. 1.

In the example shown in FIG. 2 the pressure which acts in the cylinder 41 on the piston 42 is also a function both of the pressure existing in the duct 15 and of the flow of the pump, because it depends on the position of the piston 20 or rather on the inclination of the plate 9. It is consequently possible to regulate the flow of the pump in such a manner as to maintain the power absorbed by it substantially constant.

FIG. 3 shows the diagrammatical arrangement of an apparatus for regulating the flow of two pumps which may be driven by a single prime mover motor. The object of this apparatus is to limit the flow of one or both these pumps in such a manner that the sum of the powers delivered by them, or rather the power provided by the prime mover motor which drives both of them, does not exceed a predetermined limit.

The two said pumps, indicated by 1 and 1' in FIG. 3 are by way of example analogous to that described with reference to FIG. 1, and their detailed description is consequently not repeated.

The two pumps are connected respectively to the suction ducts inlet 14 and 14', which are connected to the common discharge $s$, and the delivery pressure outlet ducts 15 and 15', in which are generated the pressures $P_1$ and $P_2$.

The flow of the two pumps is determined respectively by the position of the adjusting levers 18, 18'.

To each of these adjusting levers is connected a motor transmitting member or rod 43, 43' which slides in a support 44, 44' and carries at its extremity a control cylinder 27, 27' to which the liquid at pressure $p_1$, $p_2$ respectively, from the duct 15, 15' respectively, arrives by way of a flexible tube 45, 45'. In each control cylinder 27, 27' a control piston 28, 28' slides which acts on an arm of the right angled lever 29, 29' pivoted at 30, 30', forming a variable transmission with the same.

The other extremities of the right angled transmission levers 29, 29' rest against a distributor valve slide 46 which slides in a valve cylinder 47 and is biassed against said lever by a spring 48. To the cylinder 47 are connected a branch of the duct 14, a branch of the duct 15 (or two ducts at different pressure) and a duct 49. The ports of these three ducts in the cylinder 47 are such that, while in the position indicated in the figure the slide 46 closes the ports of the two branches of the ducts 14 and 15, when it is moved it puts one or other of these ducts in communication with the duct 49.

A hydraulic motor includes a cylinder 50 in which a piston 51 slides connected to a piston portion 52 of transversal section and effective area equal to about one half the transversal section of the piston 51. This latter thus divides the cavity of the cylinder 50 into two chambers 53 and 54, of which one has a transversal section equal to about double the other. Both the chambers are fluid tight, in that the piston rod 52 slides through a seal at 55 in the cylinder head. The chamber 53 is connected to said duct 49, and the chamber 54 is connected to the duct 15 in which the pressure $p_1$ exists.

A rocker arm or connector means 56 is freely pivoted in a slot 57 in the extremity of the shank 52 which projects from the cylinder 50. The extremities of this rocker arm 56 normally rest on the extremities of the adjusting levers 18, 18'.

The device of the foregoing description operates in the following manner.

For the reasons already explained in relation to FIG. 1, the lever 29 exerts on the valve slide 46 a force proportional to the power delivered by the pump 1, while the lever 29' exerts on the same spool 46 a force proportional to the power delivered by the pump 1'. If the device is constructed in a symmetrical manner, the total resultant force exerted on the valve slide 46 is proportional to the sum of the powers delivered by the two pumps, or rather proportional to the driving power which the prime mover motor must provide totally for the two pumps. This resultant force is counteracted by the reaction of the spring 48, which may be adjustable by any known means.

If the sum of the forces exerted by the levers 29 and 29' on the valve slide 46 is close to the predetermined value, the valve slide 46 balanced by the reaction of the spring 48 moves in one direction or the other, causing the piston 51 to move until this latter together with the connector means 56 and the adjusting levers 18, 18' are brought into the position in which the value of the total power delivered by the two pumps is restored.

The shank 59, 59' of an equlizing piston 60, 60' is connected to each of the adjusting levers 18, 18' by means of the connecting link 58, 58', the equalizing piston being biassed by a spring 61, 61' towards the position corresponding to the maximum inclination of the lever 18, 18' and the corresponding adjusting plate 9, 9'. Each shank 59, 59' slides tightly in an equalizing cylinder 62, 62' whose cavity is divided into two chambers 63, 63' and 64, 64' by the piston 60, 60'. To each of the chambers 63, 63' a branch of the pressure duct 15, 15' is connected. From each of these latter a throttle conduit 65, 65' branches off which is connected to the corresponding chamber 64, 64' by way of a throttle 66, 66'. Between each throttle 66, 66' and the corresponding chambers 64, 64' there is a maximum pressure safty valve 67, 67' kept closed by a spring 68, 68' which will be described hereinafter, and an equalizing conduit 69, 69' which includes to a chamber 71, and has a corresponding valve 70, 70'.

This device operates in the following manner. The spring 61, 61' keeps the adjusting lever 18, 18' of the corresponding pump in the position of maximum flow compatible with the position of the connector means 56, by way of the corresponding shank 59, 59' and the connecting link 58, 58'.

If the pressure $p_1$ produced by the pump 1 is greater than the pressure $p_2$ produced by the pump 1', a small passage of liquid from the conduit 65 to the conduit 65' is created by way of the equal throttle 66 and 66' and in the chamber 71 a pressure is created which is the average of the pressures $p_1$ and $p_2$. This average pressure is also exerted in the average pressure chambers 64 and 64'. Consequently the piston 60, under the equalizing action of the pressure in the high pressure chamber 63 which is greater than that in the average pressure chamber 64, is urged against the spring 61 and moves the lever 18 reducing the flow of the pump 1 until the pressure $p_1$ has become equal to the pressure $p_2$.

This allows the two pressures to be kept equal in those cases in which the pressure required by the two users connected to each of the pumps increases together with the power absorbed by each of them, such as for example when driving the two tracks of a tractor.

By closing the two valves 70, 70' this interdependence between the two pumps is eliminated, when it is not desired. In that case in the two pairs of chambers 63, 64 and 63', 64' the pressures are equal and no force is exerted on the pistons 60, 60'.

The purpose of the safety valves 67, 67' is to let liquid escape when the pressure $p_1$ or $p_2$ exceeds a maximum safety limit. The pressure then falls in the corresponding chamber 64, 64' while the pressure in the chamber 63, 63' lowers the piston 60, 60' and causes the reduction or stopping of the flow of the pump. In this manner the fall of the excessive pressure is obtained without the important flow which takes place through the usual safety valves, with undesirable heating of the fluid.

Two independent controls, 72, 72' are shown which intervene directly on the connector means 56 in order to modify the flow of one or other of the pumps, either voluntarily or depending upon other controls. It is clear that if the connector means 56 is in a horizontal position, when the valve slide 46 acts under the influence of the transmission levers 29 and 29', piston 51 retracts the connector means 56 at the same time driving adjusting levers 18, 18', and therefore regulating in proportion the adjusting plates 9, 9' and the flow of the pumps.

It should be observed that the action of the connector lever 56 and the springs 61, 62 acting on each of the levers 18, 18' in the drawing is obtained by direct mechanical connection in order to simplify the explanation, but this action can conveniently be obtained by means of hydraulic servomotors in a conventional manner. The heart of the invention is represented by the fact that the power signal of each pump is given by the product pressure times flow. The product being represented by the action on the supported arm of an adjusting lever whose other arm influences the pressure of the pump moving in proportion of the flow. In this way only, it is possible to add the signals of many pumps, differently from other known devices, in which the signal is given only by the pressure.

Many other embodiments are possible and within the capability of a technician of this field on the basis of the foregoing description. For example the spring 33 can be substituted by a piston on which a constant pressure acts. The system can comprise other pumps of constant flow whose pressure can be made to act on the valve slide 46 simultaneously with the pressures exerted by the levers 29, 29' in such a manner as to maintain the power of the whole system constant acting on the pumps of variable flow. All these and still further variations are within the field of protection of the present invention as defined in the following claims.

What is claimed is:

1. A hydraulic apparatus for regulating the fluid flow of pump means as a function of the pressure generated by said pump means, comprising pump means having suction inlet means and pressure outlet means, and including adjusting means for varying the fluid flow through said pressure outlet means; hydraulic motor means for operating said adjusting means and including a working piston connected with said adjusting means, a first chamber located on one side of said piston and communicating with said pressure outlet means, and a second chamber located on the other side of said piston; said piston having a greater effective surface area in said second chamber than in said first chamber; distributor valve means having a closed position, and a first operative position connecting said second chamber with said suction inlet means, and a second operative position connecting said second chamber with said pressure outlet means; control means responsive to an increased pressure at said pressure outlet means; and variable transmission means connecting said control means with said distributor valve means; at a predetermined maximum pressure said control means actuates said distributor valve means to move to said first operative position to reduce the pressure in said second chamber from a pressure which is higher than the pressure in said suction inlet means, so that said hydraulic motor means operates said adjusting means to reduce the flow at said pressure outlet means at a predetermined minimum pressure said variable transmission is actuated to move said distributor valve to said second operative position to increaSe the pressure in said second chamber to equal the pressure in said first chamber, so that said hydraulic motor means operates said adjusting means to increase the flow of said pressure outlet means; said adjusting means being operatively connected with said variable transmission means so as to move said distributor valve means to said closed position when said adjusting means has been operated by said hydraulic motor means to reduce, or increase the flow at said pressure outlet means.

2. Apparatus as claimed in claim 1 wherein said control means includes a cylinder communicating with said pressure outlet means, and a control piston and wherein said transmission means includes lever means whose effective lever arm is varied when said control piston and cylinder are moved by said operated adjusting means along said lever means.

3. Apparatus as claimed in claim 2 wherein said control means include biassing means acting on said lever means and on said distributor valve means for urging said lever means toward said control piston, and said distributor valve means to said normal closed position.

4. Apparatus as claimed in claim 1 including operating means for operating said adjusting means independently of said hydraulic motor means.

5. Apparatus as claimed in claim 1 wherein said hydraulic motor means includes a cylinder, said working piston forming in said cylinder said first and second chambers; and wherein said distributor valve means includes a valve cylinder having high pressure and low pressure ports, and a third port communicating with said second chamber, and a valve slide in said valve cylinder closing all ports in said closed position, and having two other positions for connecting said high pressure and low pressure ports, respectively, with said second chamber.

6. Apparatus as claimed in claim 1 wherein said hydraulic motor means includes a cylinder, said working piston forming in said cylinder said first and second chambers; wherein said control means is secured to said cylinder; and wherein said variable transmission includes a lever connected with said control means, and a pressure reducing valve operated by said lever for supplying fluid at a varying pressure to said distributor valve means; and wherein said distributor valve means include a valve cylinder, and a spring-loaded valve slide in said cylinder moved to different positions by fluid supplied by said pressure reducing valve to said valve cylinder.

7. Apparatus as claimed in claim 1 wherein said pump means includes first and second pumps having first and second adjusting members, and first and second suction inlets and pressure outlets; wherein said hydraulic motor means include connector means connecting said first and second adjusting members; wherein said control means include first and second control members responsive to increased pressure at said first and second pressure outlets of said first and second pumps, respectively; and wherein said variable transmission means include first and second variable transmissions connecting said first and second control members with said distributor valve means so that said hydraulic motor means simultaneously operates through said connector means said first and second adjusting members; and comprising first and second motion transmitting means connecting said first and second adjusting members, respectively, with said first and second control members.

8. Apparatus as claimed in claim 7 wherein said distributor valve means include a valve cylinder having ports, a valve slide in said valve cylinder, and biassing means in said valve cylinder urging said valve slide to said closed position; and wherein said first and second transmissions include first and second levers abutting said valve slide and said first and second control members, respectively, so that the effective lever arms of said first and second levers are varied when said first and second motion transmitting means move said first and second control members along said first and second levers, respectively.

9. Apparatus as claimed in claim 7 comprising first and second equalizing cylinder means and spring loaded equalizing piston means, forming first and second high pressure chambers connected with said first and second pressure outlets and first and second average pressure chambers; first and second throttle conduit means connecting said first and second average pressure chambers with said first and second pressure outlets, respectively; and equalizing conduit means connecting said first and second average pressure chambers with each other; said first and second spring loaded equalizing piston means being connected with said first and second adjusting members so as to reduce the flow of one of said first and second pumps which generates a greater pressure, and to increase the flow of the other pump.

10. Apparatus as claimed in claim 9 comprising first and second safety valves in said first and second throttle conduit means for releasing pressure fluid when the pressure in said first and second average pressure chambers exceeds a predetermined pressure.

11. Apparatus as claimed in claim 9 wherein said first and second adjusting members are first and second pivotally mounted adjusting levers; comprising first and second articulated links connecting said first and second equalizing piston means with said first and second adjusting levers; wherein said first and second motion transmitting members are articulated to said first and second adjusting levers and move with the same; first and second control cylinders communicating with said first and second pressure outlets, respectively, and being connected with said first and second motion transmitting members, respectively, for movement therewith; and wherein said first and second control members are first and second control pistons in said first and second control cylinders.

12. Apparatus as claimed in claim 1 wherein said hydraulic motor includes a cylinder, said working piston forming in said cylinder said first and second chambers; and wherein said working piston is formed with a control cylinder and has a duct connecting said control cylinder with said first chamber; wherein said control means includes a control piston in said control cylinder; and wherein said variable transmission means includes a spring loaded lever means engaged by said control piston and having an effective lever arm varying during movement of said working piston in said cylinder.

* * * * *